US009426020B2

(12) United States Patent
Vasseur et al.

(10) Patent No.: US 9,426,020 B2
(45) Date of Patent: Aug. 23, 2016

(54) DYNAMICALLY ENABLING SELECTIVE ROUTING CAPABILITY

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 13/834,578

(22) Filed: Mar. 15, 2013

(65) Prior Publication Data

US 2014/0269402 A1 Sep. 18, 2014

(51) Int. Cl.
| | |
|---|---|
| *H04L 12/26* | (2006.01) |
| *H04L 12/24* | (2006.01) |
| *H04L 12/725* | (2013.01) |
| *H04W 52/02* | (2009.01) |
| *H04L 12/707* | (2013.01) |
| *H04W 40/02* | (2009.01) |
| *H04L 12/753* | (2013.01) |

(52) U.S. Cl.
CPC ........... *H04L 41/0659* (2013.01); *H04L 41/06* (2013.01); *H04L 41/5025* (2013.01); *H04L 45/302* (2013.01); *H04W 52/0261* (2013.01); *H04L 45/22* (2013.01); *H04L 45/48* (2013.01); *H04W 40/02* (2013.01)

(58) Field of Classification Search
CPC ............................ H04L 45/28; H04L 41/0659
See application file for complete search history.

(56) References Cited

U.S. PATENT DOCUMENTS

| | | | |
|---|---|---|---|
| 7,536,452 B1 | 5/2009 | Cao et al. | |
| 8,255,532 B2 | 8/2012 | Smith-Mickelson et al. | |
| 2003/0025599 A1* | 2/2003 | Monroe | 340/531 |
| 2007/0002736 A1 | 1/2007 | Gade et al. | |
| 2010/0211680 A1 | 8/2010 | Chatterton et al. | |
| 2010/0271994 A1 | 10/2010 | Wolfe | |
| 2011/0228788 A1* | 9/2011 | Thubert et al. | 370/400 |
| 2012/0117268 A1 | 5/2012 | Shaffer et al. | |
| 2012/0147753 A1* | 6/2012 | Jayawardena et al. | 370/238 |

(Continued)

OTHER PUBLICATIONS

Hashmi, et al., "Reliability Model for Extending Cluster Lifetime Using Backup Cluster Heads in Cluster-Based Wireless Sensor Networks", 6th International Conference on Wireless and Mobile Computing, Networking and Communications, WIMOB, Oct. 2010, pp. 479-485, IEEE, Niagara Falls, Ontario, Canada.

(Continued)

*Primary Examiner* — Jay P Patel
(74) *Attorney, Agent, or Firm* — Parker Ibrahim & Berg LLC; James M. Behmke; Stephen D. LeBarron

(57) ABSTRACT

In one embodiment, a particular node in a shared-media communication network determines a resource level and in response to determining a trigger condition (e.g., that the resource level is below a threshold), the particular node enters a selective forwarding mode. In the selective forwarding mode, the particular node does not forward non-critical messages. The particular node also notifies one or more neighboring nodes in the shared-media communication network of the entered selective forwarding mode. In another embodiment, a node may receive from a neighboring node, an indication of having entered a selective forwarding mode, and in response the node may forward only critical messages to the neighboring node.

20 Claims, 11 Drawing Sheets

(56) References Cited

U.S. PATENT DOCUMENTS

| | | | |
|---|---|---|---|
| 2012/0155276 A1* | 6/2012 | Vasseur et al. | 370/237 |
| 2012/0237624 A1* | 9/2012 | Msika et al. | 424/757 |
| 2012/0307629 A1* | 12/2012 | Vasseur et al. | 370/228 |
| 2012/0324273 A1* | 12/2012 | Shaffer et al. | 714/4.12 |
| 2013/0016759 A1* | 1/2013 | Hui et al. | 375/135 |
| 2013/0022053 A1* | 1/2013 | Vasseur et al. | 370/428 |
| 2013/0028143 A1 | 1/2013 | Vasseur et al. | |
| 2013/0051250 A1* | 2/2013 | Shaffer et al. | 370/252 |
| 2013/0064072 A1* | 3/2013 | Vasseur et al. | 370/225 |
| 2013/0067063 A1* | 3/2013 | Vasseur et al. | 709/224 |
| 2013/0124716 A1 | 5/2013 | Moreman et al. | |
| 2013/0223218 A1* | 8/2013 | Vasseur et al. | 370/232 |
| 2013/0227055 A1* | 8/2013 | Vasseur et al. | 709/217 |
| 2013/0227336 A1* | 8/2013 | Agarwal et al. | 714/4.3 |
| 2013/0250754 A1* | 9/2013 | Vasseur et al. | 370/225 |
| 2014/0029610 A1* | 1/2014 | Vasseur et al. | 370/389 |

OTHER PUBLICATIONS

Swartz, et al., "Design and Simulation of a High Performance Emergency Data Delivery Protocol", 3rd International Conference on Networking and Services, ICNS, Jun. 2007, pages 6 pages, IEEE Computer Society, Athens Greece.

Wei, et al., "Autonomous Community Cooperation Technology for Real-Time Transmission of Emergency Information", 13th International Conference on High Performance Computing and Communications (HPCC), Sep. 2011, pp. 661-667, IEEE, Banff, Alberta, Canada.

Winter, et al., "RPL: IPv6 Routing Protocol for Low-Power and Lossy Networks", Request for Comments 6550, Mar. 2012, 157 pages, Internet Engineering Task Force Trust.

Fan, et al., "Autonomous Community Cooperation Technology for Real-Time Transmission of Emergency Information", IEEE 13th International Conference on High Performance Computing and Communications (HPCC), pp. 661-667, Sep. 2, 2011, IEEE, Banff, Alberta, Canada.

Lampreia, et al., "Notification of Transmittal of the International Search Report and the Written Opinion of the International Searching Authority, or the Declaration", PCT/US2014/019817, Aug. 11, 2014, 17 pages, Patent Cooperation Treaty, European Patent Office, Rijswijk, Netherlands.

Shafiq, et al., "Reliability Model for Extending Cluster Lifetime Using Backup Cluster Heads in Cluster-Based Wireless Sensor Networks", IEEE 6TH International Conference on Wireless and Mobile Computing, Networking and Communications (WIMOB), pp. 479-485, Oct. 11, 2010, IEEE, Piscataway, New Jersey.

* cited by examiner

DYNAMICALLY ENABLING SELECTIVE ROUTING CAPABILITY

TECHNICAL FIELD

The present disclosure relates generally to computer networks, and, more particularly, to selective forwarding modes in a routing topology of a shared-media communication network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

For example, often multiple transmission attempts are required to successfully send a packet across a communication network, resulting in higher energy consumption. In energy constrained environments, the multiple transmissions prove to be expensive and may result in disconnected network regions (e.g., graphs) until energy is replenished. Energy and other scarce resources, such as memory, are also consumed for maintenance of various states (e.g., routing states) and for processing tasks such as routing table look ups, validating authenticity, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
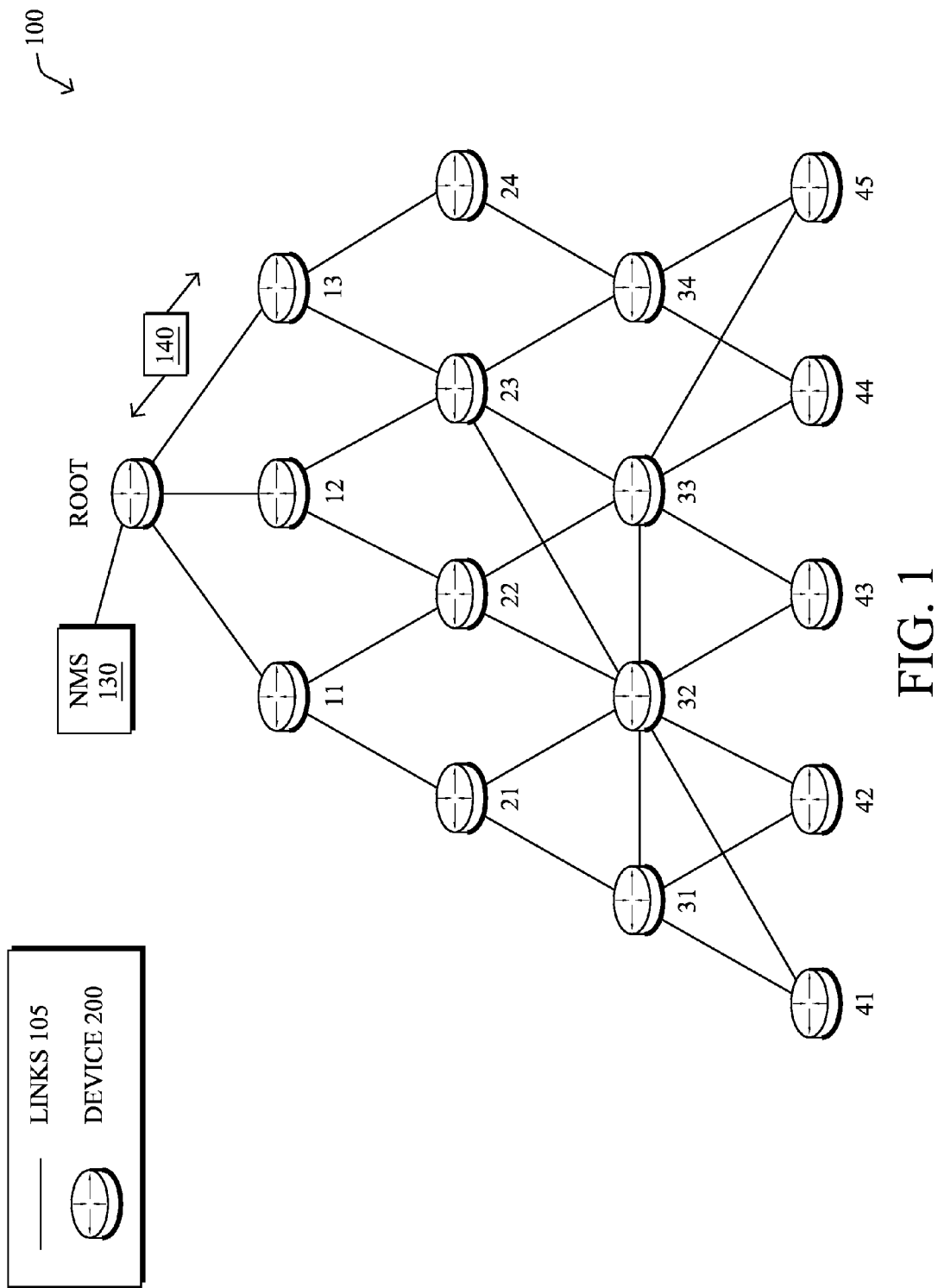
FIG. 1 illustrates an example communication network.

According to one or more embodiments of the disclosure, a particular node in a shared-media communication network may determine a trigger condition (e.g., a resource level of the particular node itself). In response to determining the trigger condition (e.g., a resource level being below a first threshold), the particular node may enter into a selective forwarding mode, where the particular mode does not forward non-critical messages while in the selective forwarding mode. After entering the selective forwarding mode, the particular node may notify one or more neighboring nodes in the shared-media communication network of the entered selective forwarding mode.

According to one or more additional embodiments of the disclosure, a node in a shared-media communication network may receive a notification from a neighboring node indicating that the neighboring node has entered a selective forwarding mode. In response to the neighboring node having entered the selective forwarding mode, the node may send only critical messages to the neighboring node.

According to one or more additional embodiments of the disclosure, a management node in a shared-media communication network may receive a message from a particular node indicating that the particular node has entered a selective forwarding mode. The management node may determine an alternate path used to forward non-critical traffic that may bypass the particular node. While monitoring the alternate path, the management node may determine whether the alternate path complies with a service level agreement for all traffic. In response to determining that the alternate path does comply with the service level agreement for all traffic, the management node may send an instruction to the particular node to operate as a leaf node.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared-media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, may also be in communication with the network 100.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
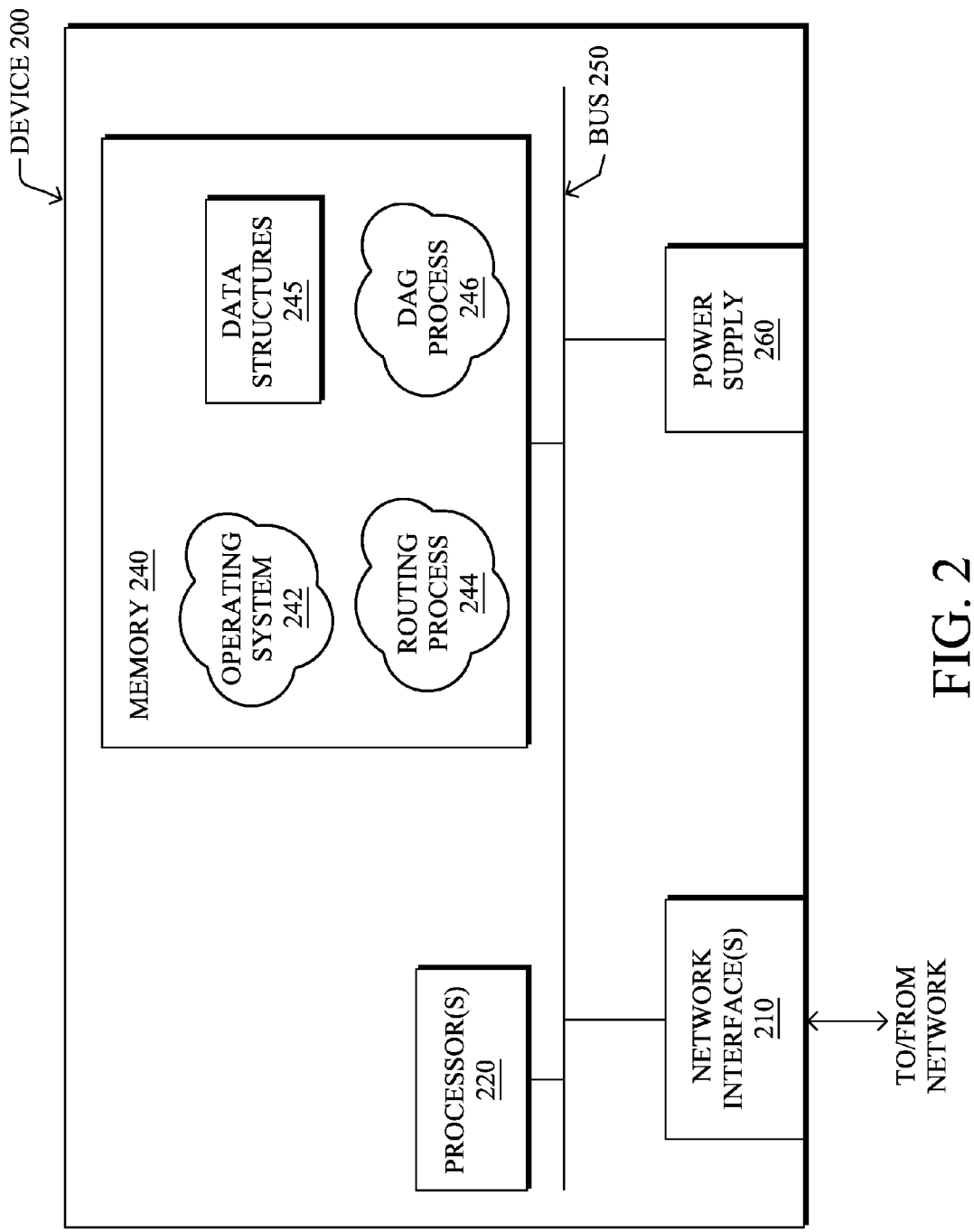
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 in shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a directed acyclic graph (DAG) process 246, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Figure 3:
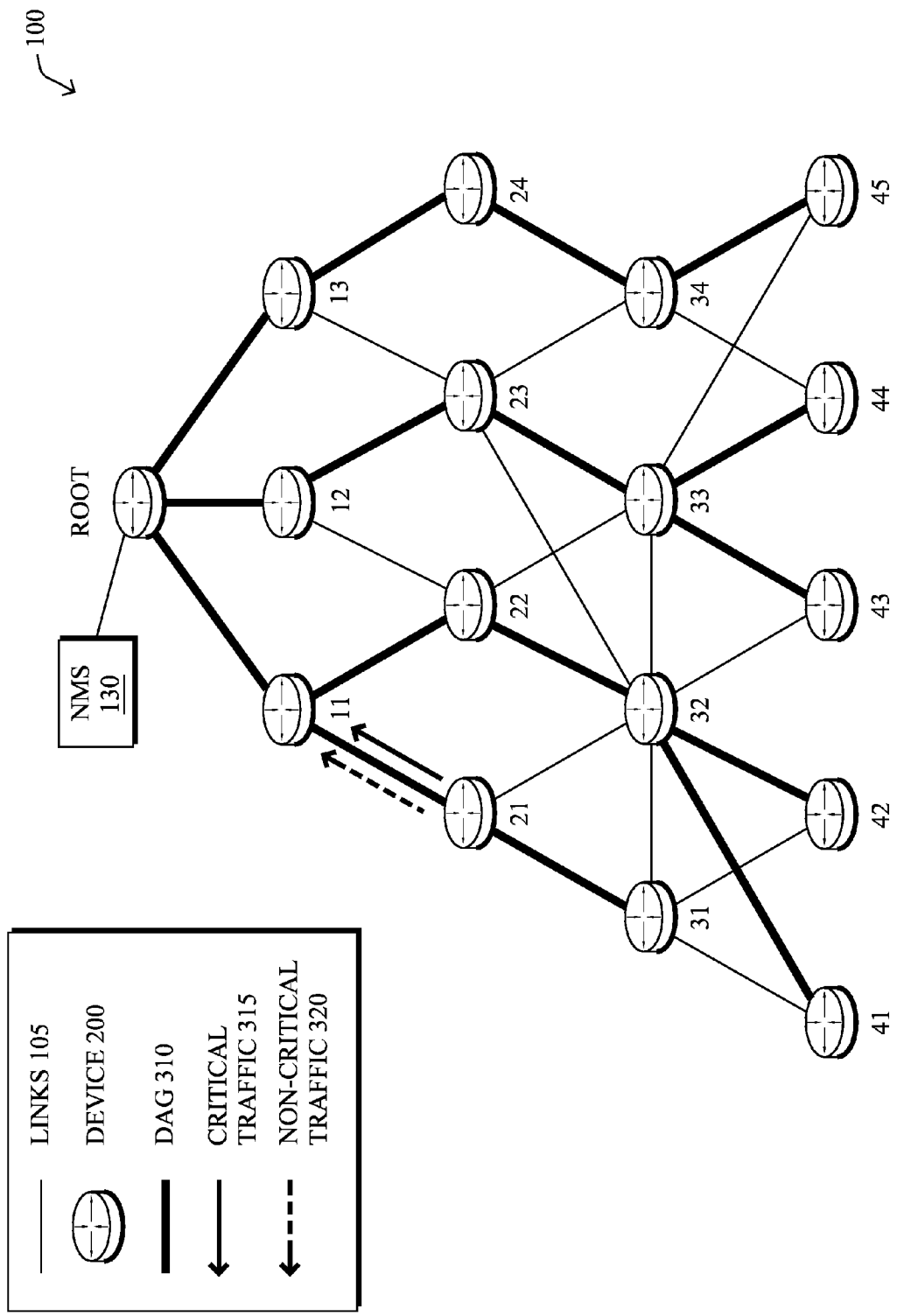
FIG. 3 illustrates an example routing topology (e.g., a directed acyclic graph of "DAG") in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf (or host) nodes via routing nodes. In particular, as described herein, the nodes may forward both critical traffic 315 and non-critical traffic 320 toward the root (e.g., as specific classifications of traffic 140).

As noted above, the IETF has specified two modes of operation for the RPL routing protocol: storing modes (e.g., nodes store routing tables) that provide a substantially optimum path for Point-to-Point traffic within the network at the cost of maintaining routing tables and thus consuming more resources (e.g., remaining memory, processing capacity, and battery level) of the nodes, and the non-storing mode (e.g., nodes do not store routing tables) wherein packets travel through the DAG along default routes, at which point the packets may be directed to a destination using source routing when the destination is in the PAN (personal area network). The non-storing mode provides less optimum paths but preserves resources of the nodes in the shared-media communication network.

Furthermore, in both the storing and the non-storing modes (e.g., particularly the storing mode), a node may run out of one or more resources (e.g., remaining memory, processing capacity, battery level), at which point the node may die, leading to a global convergence of the DAG. Thus, a sub-optimal path to the DAG root may result in addition to churns, which may impact the SLA (service level agreement) for critical traffic. DAG convergence may also result in a sudden flood of control traffic and may cause application traffic to be unreachable during convergence.

Dynamic Enabling of Selective Routing

The techniques herein provide a mechanism that allows a node having a low level of resources to restrict routing capability to specific traffic (e.g., critical messages), thus preserving the resources for only critical traffic. For instance, a node that has detected a low level of one or more resources may inform neighboring nodes of the type of traffic (e.g., critical traffic) the node will continue to forward within the shared-media communication network with the limited resources. Other types of traffic, not specified by the node (e.g., non-critical traffic), may no longer be forwarded. As described herein, when a node is operating in a selective forwarding (SF) mode within the network (e.g., an optimum DAG), the surrounding nodes in the network (e.g., a corresponding sub-DAG) may select a new intermediate node (e.g., DAG parent) for non-critical traffic. The nodes with limited resources (e.g., processing capacity, remaining memory, battery level, etc.) may then act as forwarders for only a limited portion of traffic (e.g., critical traffic), thereby preserving the SLA for such critical traffic. When the resources are replenished, the affected node may clear the SF mode and return to standard forwarding mode, where all traffic may again be forwarded by that node.

Specifically, according to one or more embodiments of the disclosure as described in detail below, a particular node in a shared-media communication network may determine a trigger condition (e.g., a low resource level), and in response may enter a selective forwarding mode and notify neighboring nodes that the particular node has entered the selective forwarding mode. In response to the particular node having entered the selective forwarding mode, one or more neighboring nodes may send only critical messages to the particular node.

Illustratively, the techniques described herein may be performed by hardware, software, and/or firmware, such as in accordance with the routing process 244, which may contain computer executable instructions executed by the processor 220 to perform functions relating to the techniques described herein, e.g., in conjunction with DAG process 246. For example, the techniques herein may be treated as extensions to conventional protocols, such as the various shared-media communication and routing protocols, and as such, may be processed by similar components understood in the art that execute those protocols, accordingly.

Operationally, the techniques herein generally relate to nodes dynamically signaling to nodes in the surrounding network (e.g., sub-DAG) which traffic types that the nodes may continue to forward. In particular, the nodes may signal that they will only forward critical traffic because such traffic may be minimal but may suffer from increased delay. For example, the techniques relate to a signaling mechanism used to indicate to the nodes in the surrounding network the traffic type that a node may continue to forward. For example, the signaling mechanism may indicate that the node is entering a selective forwarding mode, which implies that only critical traffic is to be forwarded by that particular node. In addition, as described further below, an NMS may trigger path quality monitoring when the SF mode is entered to move the node's routing operation to an ON/OFF mode, where the node may be instructed to merely operate as a leaf node (hosting/sourcing its own traffic, but forwarding no traffic).

Figure 4:
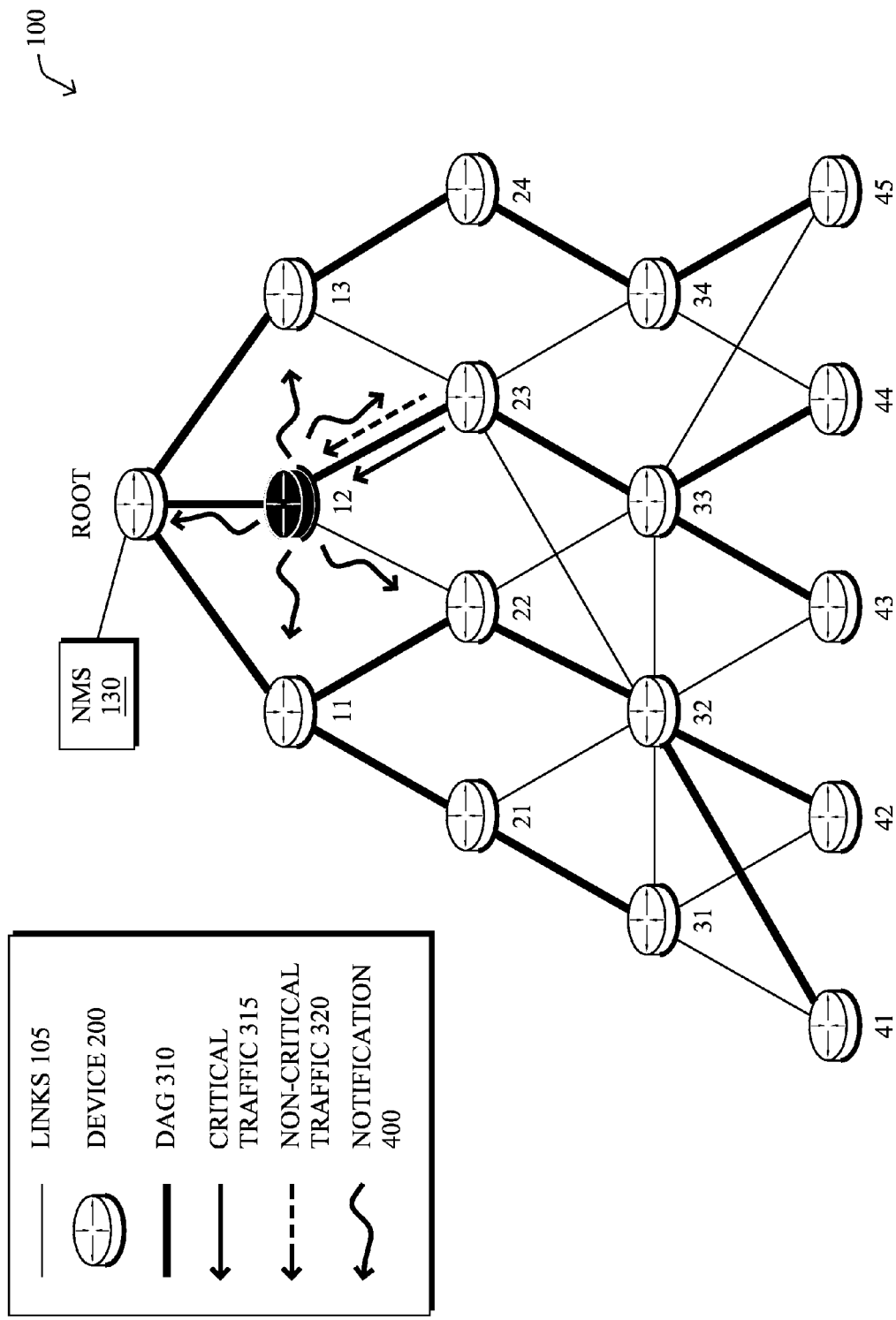
FIG. 4 illustrates an example view of a node in the communication network having entered a selective forwarding mode and notifying neighboring nodes.

FIG. 4 illustrates an example of a node in the shared-media communication network having entered an SF mode and having notified neighboring nodes (notification 400). In particular, a given node (e.g., node 12 as in FIG. 4) may determine a level of one or more of its resources, such as available memory, a processing capacity, a battery level, etc. In response to determining a "low" resource level, for example, below some threshold percentage of available memory, the node 12 may then enter the SF mode to cease forwarding non-critical messages. Notably, local or NMS-based policy may be used to determine the set of parameters used by the node to enter and exit the SF mode (e.g., using a dual threshold approach to avoid traffic oscillation for non-critical traffic, that is, where a first threshold is used to enter the SF mode, and a second threshold is used to determine when to exit the SF mode, as described below).

In one embodiment of the techniques herein, the node 12 may optionally be configured to enter a particular type of SF mode, where for each particular type of SF mode, a specific type of traffic may be forwarded (or cease to be forwarded). For example, the node 12 may enter a first mode ("SF1 mode") to forward only traffic of type "1" (e.g., emergency notification traffic) or alternatively may enter a second mode ("SF2 mode") to forward traffic of type "1" and type "2" (e.g., high-priority data traffic). The mapping between the traffic types and the mode of operation may be user defined or may be defined by the NMS. For example, when using additional SF modes, the NMS may be used to indicate (e.g., when a node registers) that a node (e.g., any nodes, or possibly specific nodes, such as node 12 or all nodes of rank "1", etc.) entering into the SF mode may continue to forward only the specifically identified type(s) of traffic. In another embodiment, the node itself may indicate the forwarding types, such as within the notification 400 or else in advance such as within routing control messages. For instance, in this latter embodiment, nodes in the sub-DAG may select specific nodes as parents according to the type of traffic that the node may still be able to forward to meet the SLA for the particular traffic types. Note that traffic types may be mapped to packet marking according to the NMS, such as flags, identifiers, priority levels, data type fields, Diffserv code points, etc.

As noted above, after entering the SF mode, the node 12 may notify (with notification 400) one or more neighboring nodes in the shared-media communication network of the entered selective forwarding mode. Illustratively, in one embodiment, when the node 12 enters the SF mode, the node may reset a trickle timer and send a DIO message after setting the "mode of operation" (MOP) bit accordingly as the notification message. In this manner, when a neighboring node receives the DIO message with MOP=SF, the message may indicate that the node 12 (e.g., a parent node) may not forward non-critical traffic. Thus, the neighboring node may update a routing table to select a backup parent (e.g. an alternate node) for non-critical traffic. In an alternative embodiment, the notification message is a newly defined and dedicated message meant to specifically indication the entered SF mode to surrounding neighbors.

Figure 5A:
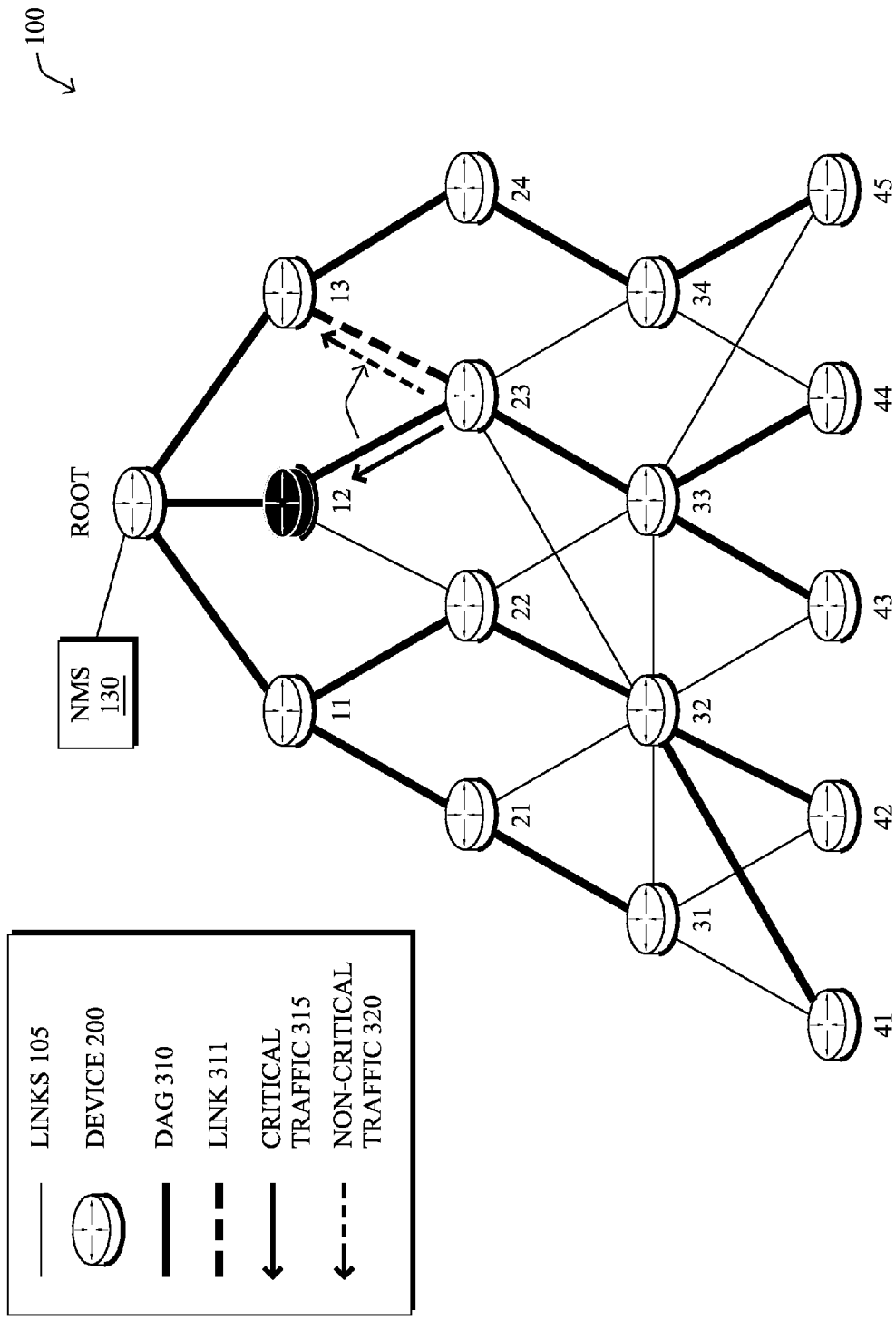
FIG. 5A illustrates an example of sending critical messages to the node in the selective forwarding mode and selecting an alternate node for non-critical messages.

As shown in FIG. 5A, in response to receiving a notification from the node 12 in the SF mode, a child 23 of the node 12 in the SF mode may begin redirecting at least the non-critical traffic 320 on an alternate path, while optionally maintaining the original (primary) path to node 12 for critical traffic. In this manner, the child node 23 maintains two paths, one corresponding to the node 12 in the SF mode (e.g., forwarding critical traffic 315) and another path (link 311) corresponding to a backup parent (e.g., node 13) which may forward all non SF type traffic (e.g., non-critical traffic 320). Notably, the backup parent may have been selected in advance of the original parent's entry into SF mode, or else may be selected in response to the entry, accordingly. In addition, the child 23 may send a DAO message corresponding to SF state of the node 12 to the FAR (e.g., the root) to direct traffic types to select the corresponding paths in the opposite direction (e.g., root-13-23 for non-critical traffic, while using root-12-23 for critical traffic). Note that a code point may be encoded in a TLV to indicate the traffic type for the selected backup parent corresponding to the non-critical traffic. Alternatively or in addition, the SF mode node itself (e.g., node 12) may send a notification to the network management node (e.g., root) indicating that it has entered the SF mode.

In response to receiving such a message, and/or in response to receiving the DAO from other nodes (e.g., node 23 as mentioned above), the management node may determine an alternate path that the nodes in the sub-DAGs may use to forward the non-critical traffic, and optionally all traffic (critical and non-critical). For instance, in one embodiment, once the management node has determined an alternate path for non-critical traffic, the management node may monitor the path to determine whether the alternate path complies with a service level agreement for all traffic. It is possible, therefore, that the backup node 13 may provide the child node 23 with a path capable of forwarding all traffic. In response, the child node 23, may switch parent nodes and forward all traffic to the backup parent 13.

Figure 5B:
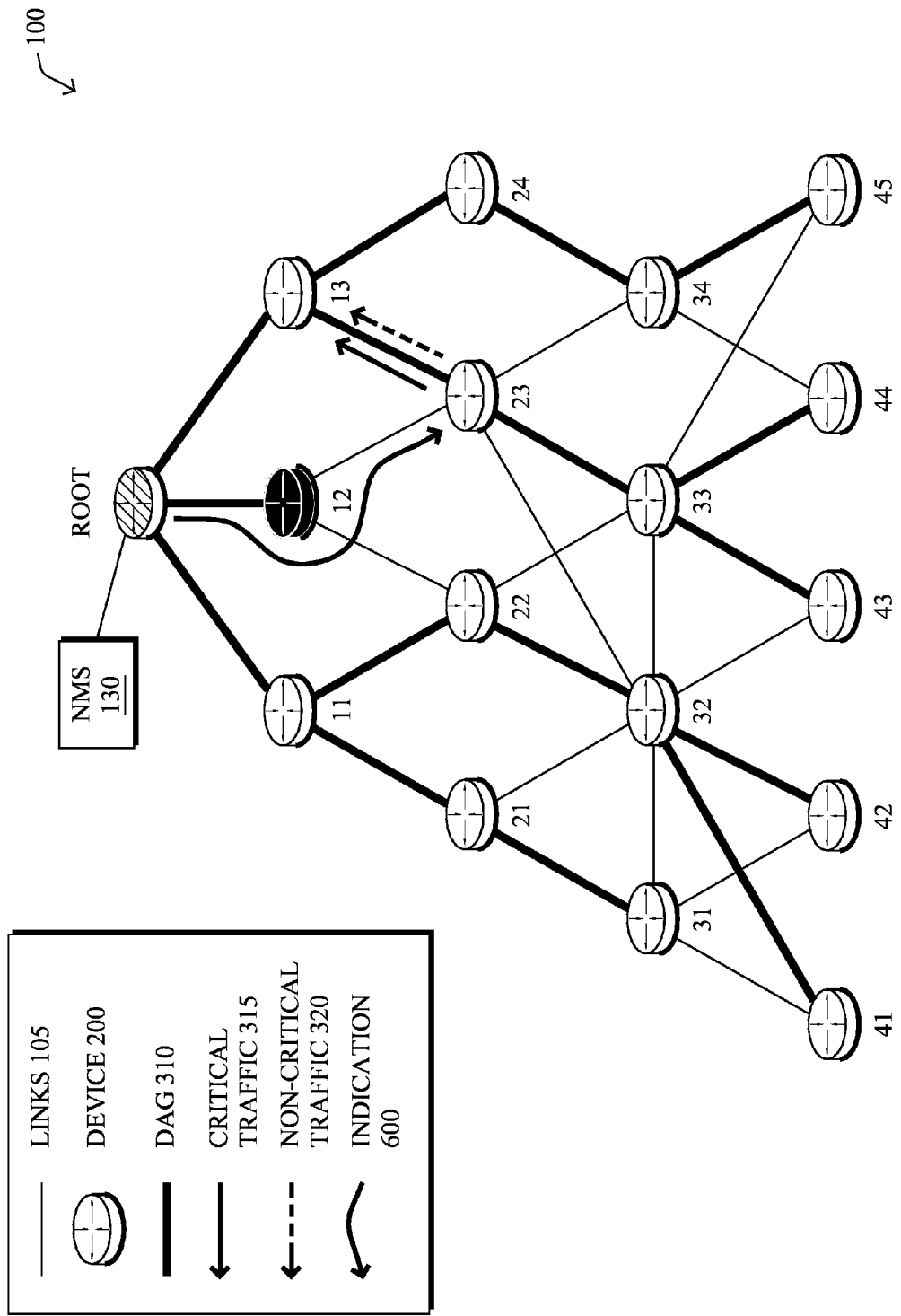
FIG. 5B illustrates an example view of the alternate node being used for all traffic.

For example, as shown in FIG. 5B, in response to determining that the alternate path does comply with the service level agreement for all traffic, the management node may send an instruction to the node 12 to operate as a leaf node to further preserve resources. While operating as a leaf node, the node 12 may cease to forward traffic. For instance, after the node 12 resets a trickle timer, neighboring nodes in the sub-DAG may receive a message that the node 12 is operating as a leaf node, and in response the neighboring nodes in the sub-DAG may be required to send all traffic to an alternate parent node, accordingly.

Figure 6A:
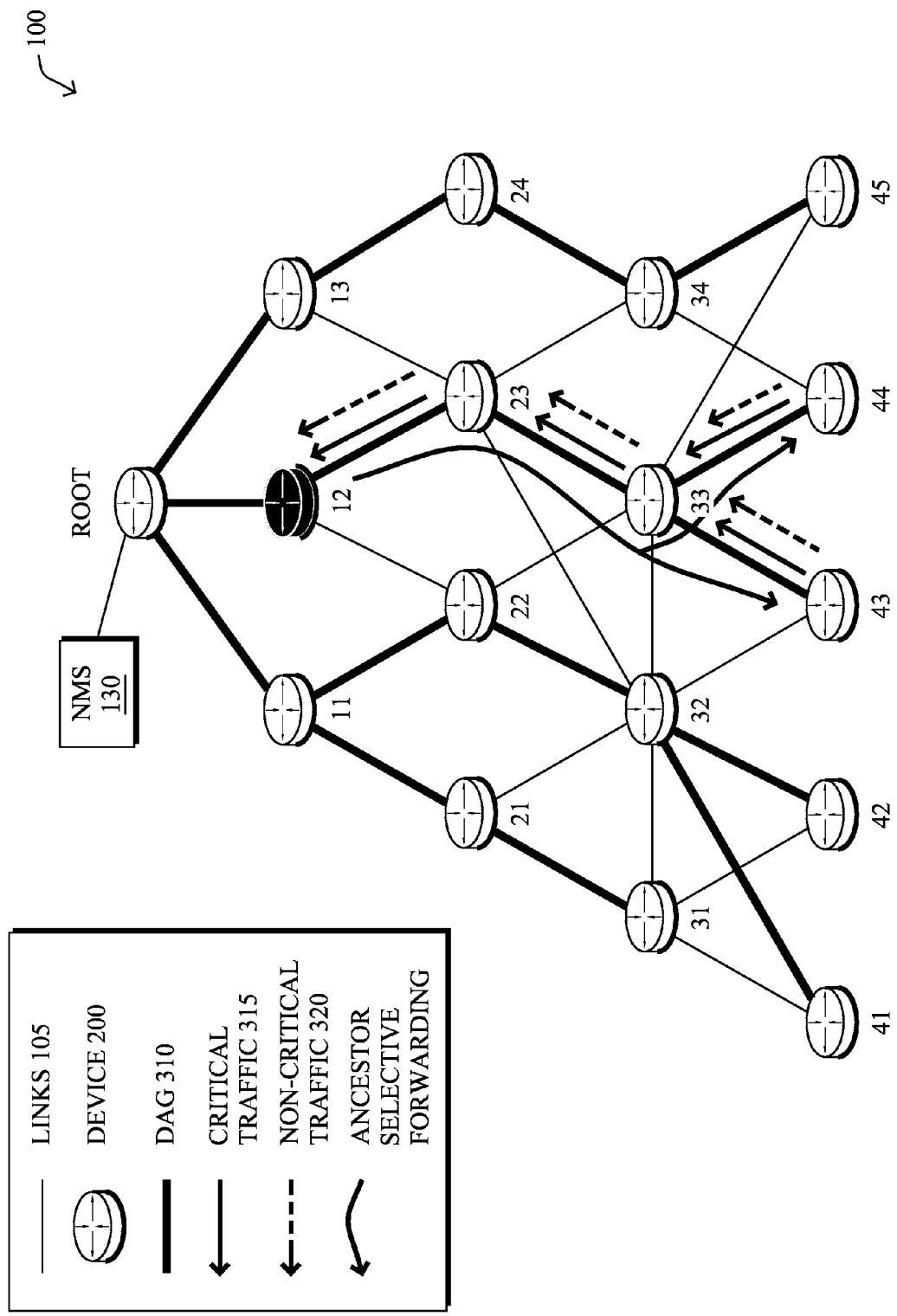
FIGS. 6A-6B illustrate an example of ancestor selective forwarding.
Figure 6B:
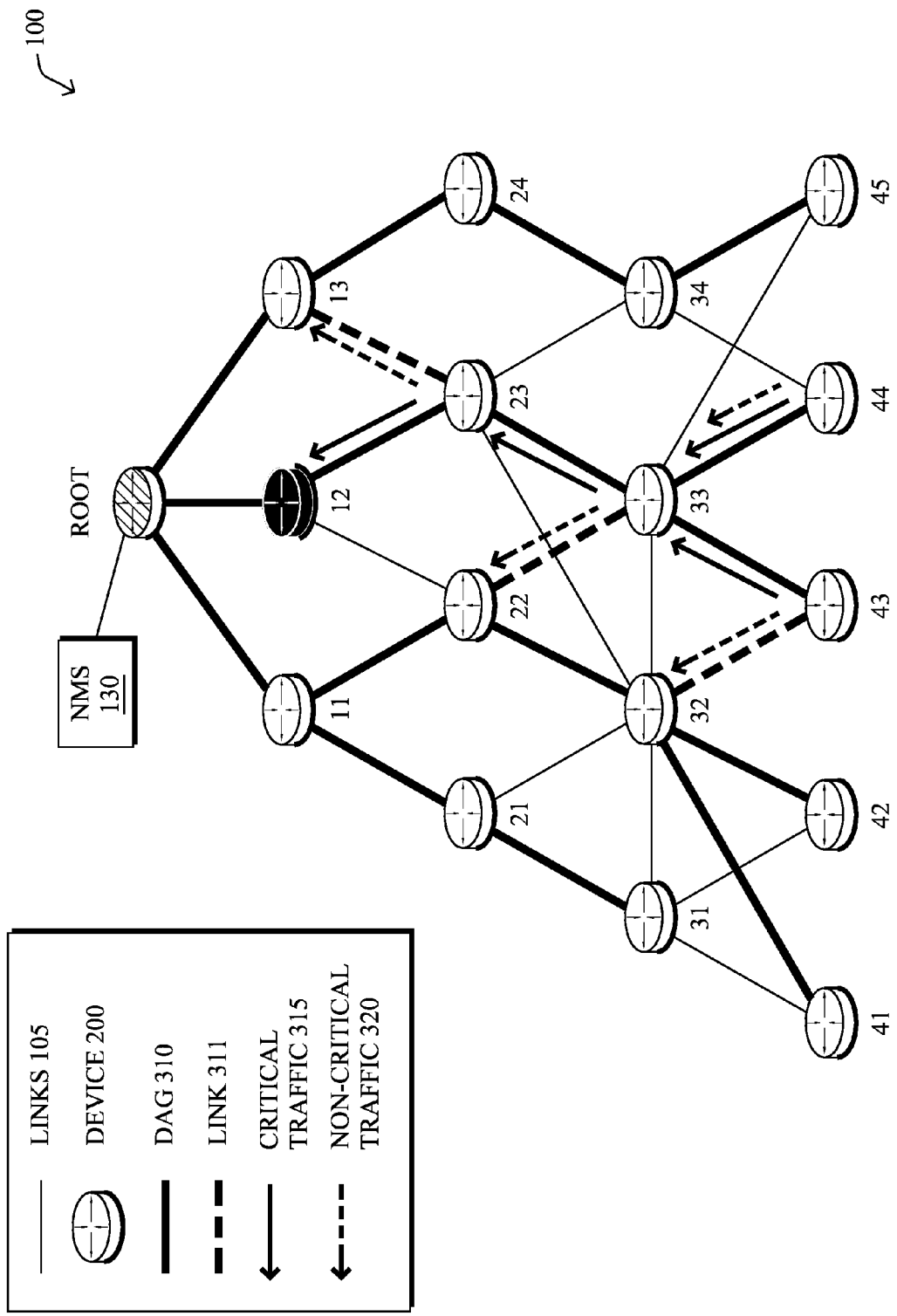

In addition to the immediate neighbors of the SF mode node, other nodes within the network may also be affected by the SF mode, such as nodes within the sub-DAG beneath the SF mode node. For instance, in one embodiment herein, the DIO from the child node 23 may also include additional information about the path quality of the backup parent which other nodes in the sub-DAG may use to determine whether to switch parent nodes. In another embodiment, after the node 12 has entered the SF mode, the node 12 (or alternatively the node 23) may notify one or more topologically subordinate nodes that at least one topological ancestor node has entered the SF mode. In other words, as shown in FIG. 6A, the DIO message (or other explicit notification message) may be forwarded with an ancestor selective forwarding (ASF) bit, indicating to the nodes in the sub-DAG of the node 12 that one or more ancestor nodes are operating in the SF mode (e.g., at least node 12). When the nodes in the sub-DAG receive the DIO message including the ASF bit set, they may perform a path computation check to determine whether a more optimum parent may exist for the non-critical traffic. As shown in FIG. 6B, certain nodes of the sub-DAG (e.g., nodes 23, 33, and 43) have selected a backup parent for their non-critical traffic. Note that in the event there is no alternative path, or in the event that the current path is significantly better for non-critical traffic, the topologically subordinate (sub-DAG) nodes may continue to forward all traffic on the original DAG 310 (e.g., node 44). In such an instance, this non-critical traffic may be redirected by a topologically superior node (e.g., node 33 to node 22), and may still avoid the SF mode node, accordingly.

In yet another embodiment, when a particular node in the selective forwarding mode (e.g., node 12) determines that the resource level has been restored (e.g., promotion of the node to higher routing capabilities), the node may clear the selective forwarding mode and resume standard forwarding where both non-critical messages and critical messages are forwarded (e.g., all traffic). For example, as mentioned above, a dual threshold may be used to avoid traffic oscillation for non-critical traffic, where a second threshold, generally a greater resource level than that of the first threshold (to avoid the occurrence of "teetering" over a single threshold level). In addition, the particular node (e.g., node 12) may reset a trickle timer and after clearing the SF mode, may forward a DIO message such that the DAG may switch to a previous state where all nodes in the sub-DAG may return to original parent nodes for forwarding all traffic types.

Figure 7:
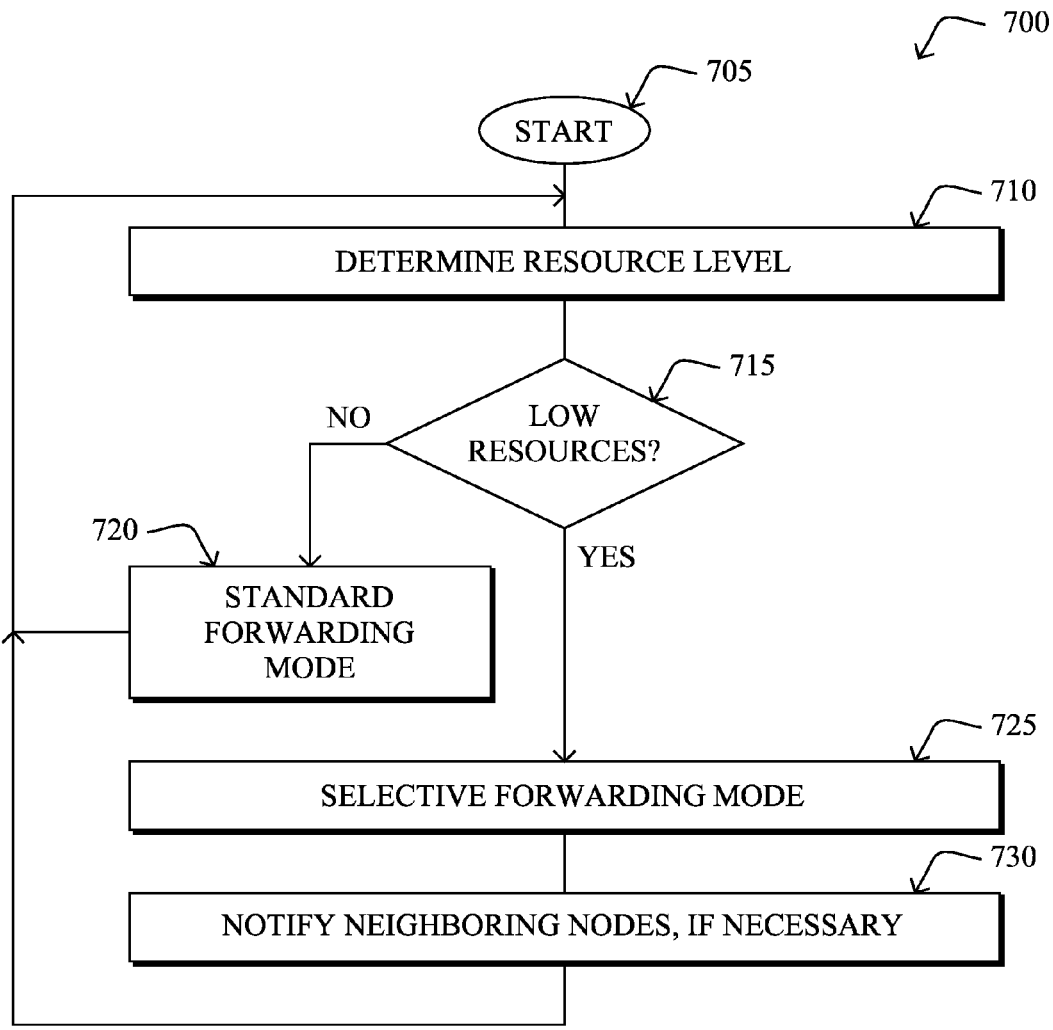
FIG. 7 illustrates an example simplified procedure for entering a selective forwarding mode in a shared-media communication network.

FIG. 7 illustrates an example simplified procedure 700 for entering a selective forwarding mode in a shared-media communication network in accordance with one or more embodiments described herein. The procedure 700 may start at step 705, and continues to step 710, where, as described in greater detail above, a particular node in a shared-media communication network may determine its current resource level. As shown in step 715, the particular node may determine whether the resource level is low. When the particular node determines that the resource level is not low, the particular node may remain in the standard forwarding mode in step 720, where the particular node may receive and forward all traffic (i.e., routing is fully enabled). Based on determining that the resource level is low in step 715, however, the particular node may enter the selective forwarding mode in step 725. Accordingly, once the particular node has entered the selective forwarding mode, the particular node may, in step 730, notify one or more neighboring nodes in the shared-media communication network of the entered selective forwarding mode. After notifying the neighboring nodes of the entered selective forwarding mode, the particular node may return to monitoring the resource level. Notably, as described above, the resource level may return to an acceptable level (e.g., based on the same threshold or else a dual threshold configuration), at which time the node may exit the selective forwarding mode (enter standard mode) in step 720.

Figure 8:
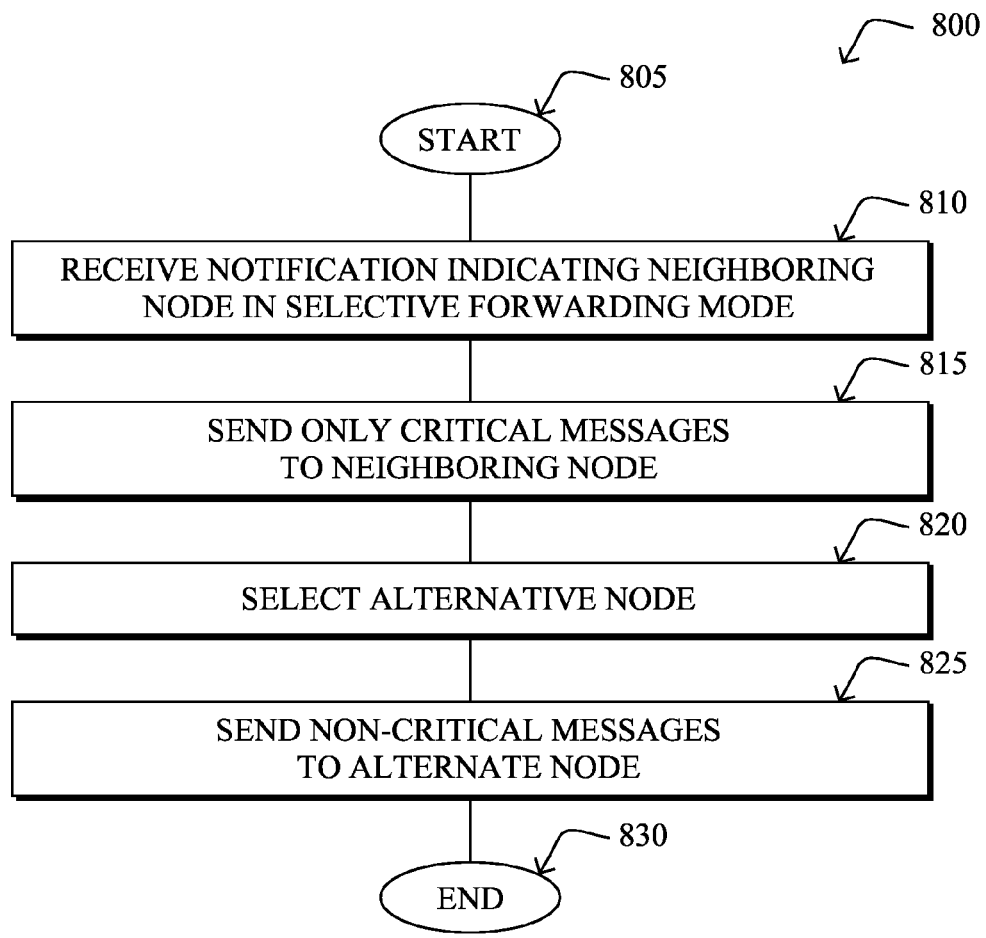
FIG. 8 illustrates an example simplified procedure for forwarding only critical messages to a neighboring node.

In addition, FIG. 8 illustrates an example simplified procedure 800 for sending only critical messages to a neighboring node in a shared-media communication network in accordance with one or more embodiments described herein. The procedure 800 may start at step 805, and continues to step 810, where, as described in greater detail above, the node may receive a notification from a neighboring node (e.g., a parent node) in the shared-media communication network indicating that the neighboring node has entered a selective forwarding mode. As shown in step 815, in response to the neighboring node having entered the selective forwarding mode, the node may send only critical messages (or otherwise specified messages) to the neighboring node. Furthermore, as shown in step 820, the node may select an alternate node in the shared-media communication network, which as described above may occur in response to the notification or in advance. As such, in step 825, the node may send non-critical messages to the alternate node. The procedure illustratively ends in step 830.

Figure 9:
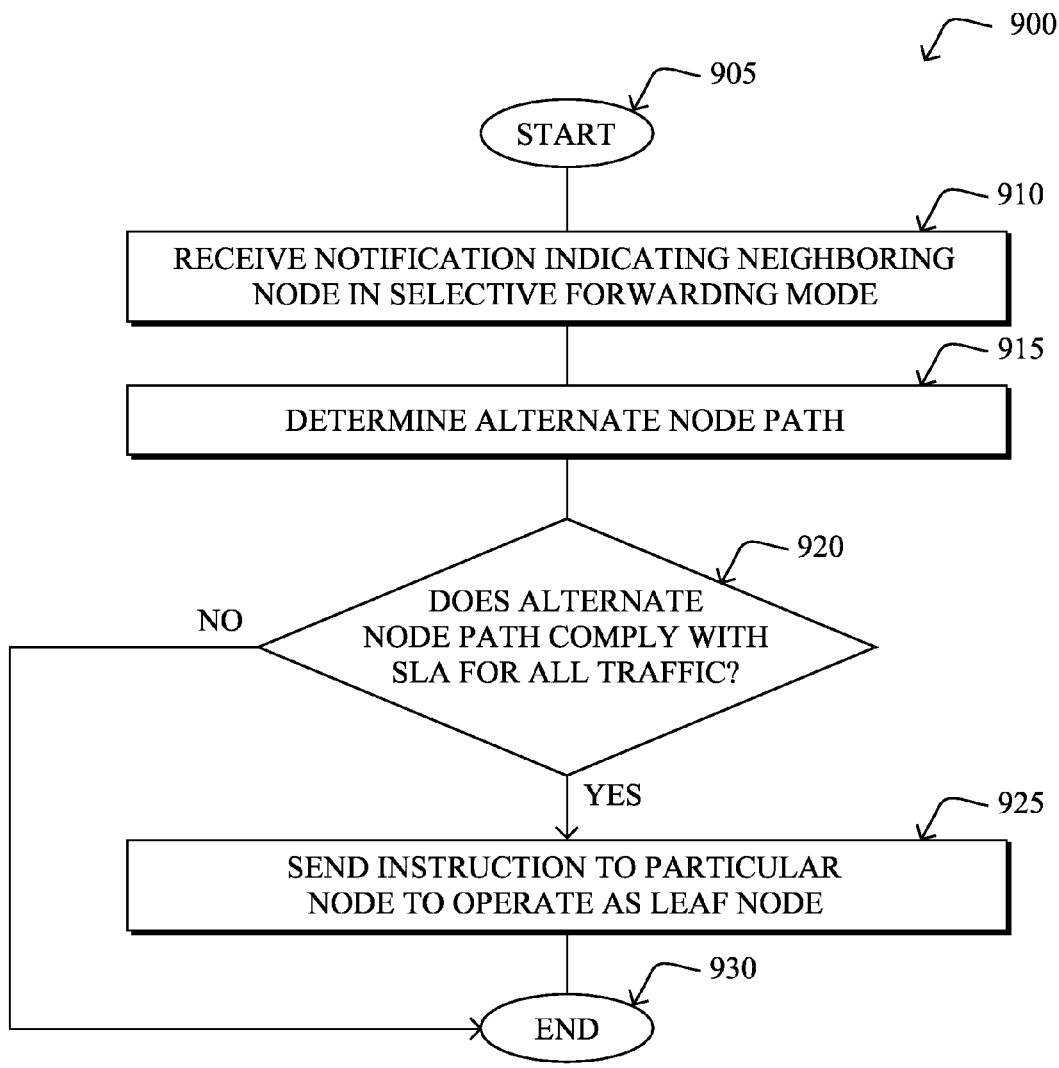
FIG. 9 illustrates an example simplified procedure for determining whether an alternate path complies with a service level agreement.

Moreover, in accordance with one or more embodiments described herein, FIG. 9 illustrates an example simplified procedure 900 for determining whether an alternate path complies with a service level agreement (SLA). The procedure 900 may start at step 905, and continues to step 910, where, as described in greater detail above, a management node in the shared-media communication network (e.g., an NMS, the root node, etc.) may receive a message from a particular node (or neighboring node of the particular node) indicating that the particular node has entered a selective forwarding mode. As shown in step 915, the management node may determine an alternate path used to forward non-critical traffic that bypasses the particular node. In step 920, the management node may determine whether the alternate node path complies with a service level agreement for all traffic. When the alternate node path complies with the service level agreement for all traffic, as shown in step 925, the management node may send an instruction to the particular node to operate as a leaf node, and/or an instruction for the neighboring nodes of the particular node to forward all traffic on the alternate node path. When the alternate node path does not comply with the service level agreement for all traffic, the procedure illustratively ends in step 930.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for dynamic enabling of selective routing in a shared-media communication network. In particular, the techniques herein dynamically enable a node in a shared-media network to preserve one or more resources by limiting forwarding capabilities to only specific types of traffic (e.g., critical traffic). The techniques may also then trigger nodes in the surrounding network (e.g., a sub-DAG) to determine alternate routes to send non-critical traffic. Thus, SLAs in constrained networks (e.g., LLNs) may be preserved without completely disabling all traffic forwarding. That is, resource preservation may be achieved by limiting traffic forwarded by a node having a low level of resources to critical traffic.

While there have been shown and described illustrative embodiments that provide for dynamic enabling of selective routing in a shared-media communication network, it is to be understood that various other adaptations and modifications may be made within the spirit and scope of the embodiments herein. For example, the embodiments have been shown and described herein with relation to LLNs and in particular to RPL protocols. However, the embodiments in their broader sense are not as limited, and may, in fact, be used with other types of shared-media networks and/or protocols. Also, while the techniques described above generally reference wireless communication, other shared-media (e.g., PLC) may be used. In addition, while the techniques herein generally describe the trigger condition as a threshold level of resources, other trigger conditions may exist, such as time of day, scheduled maintenance, testing, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a trigger condition at a particular node in a shared-media communication network, wherein determining the trigger condition includes:
      determining a level of resources of the particular node; and
      determining the trigger in response to the resource level being below a first threshold;
   in response to the trigger condition, entering into a selective forwarding mode, wherein non-critical messages are not forwarded by the particular node in the selective forwarding mode; and
   notifying one or more neighboring nodes in the shared-media communication network of the entered selective forwarding mode.

2. The method of claim 1, further comprising:
   monitoring one or more resources to determine the resource level, wherein the plurality of resources may be selected from a group consisting of: available memory, a processing capacity, and a battery level.

3. The method of claim 1, further comprising:
   in response to the resource level being above a second threshold while in the selective forwarding mode, clearing the selective forwarding mode to resume forwarding non-critical messages.

4. The method of claim 1, further comprising:
   notifying one or more topologically subordinate nodes that at least one topological ancestor node has entered the selective forwarding mode.

5. The method of claim 1, further comprising:
   receiving an instruction to operate as a leaf node; and in response, ceasing to forward traffic.

6. An apparatus comprising:
   one or more network interfaces to communicate with a shared-media communication network as a particular node;
   a processor coupled to the network interfaces and adapted to execute one or more processes; and
   a memory configured to store a process executable by the processor, the process when executed operable to:
      determine a trigger condition at the particular node in a shared-media communication network, wherein determining the trigger condition includes:
         determining a level of resources of the particular node; and
         determining the trigger in response to the resource level being below a first threshold;
      enter into a selective forwarding mode, in response to the trigger condition, wherein non-critical messages are not forwarded by the particular node in the selective forwarding mode; and
      notify one or more neighboring nodes in the shared-media communication network of the entered selective forwarding mode.

7. The apparatus of claim 6, wherein the process when executed is further operable to:
   monitor one or more resources to determine the resource level, wherein the plurality of resources may be selected from a group consisting of: available memory, a processing capacity, and a battery level.

8. The apparatus of claim 6, wherein the process when executed is further operable to:
   clear the selective forwarding mode to resume forwarding non-critical messages, in response to the resource level being above a second threshold while in the selective forwarding mode.

9. The apparatus of claim 6, wherein the process when executed is further operable to:
   notify one or more topologically subordinate nodes that at least one topological ancestor node has entered the selective forwarding mode.

10. The apparatus of claim 6, wherein the process when executed is further operable to:
    receive an instruction to operate as a leaf node; and in response,
    cease forwarding traffic.

11. A method, comprising:
    receiving a notification from a neighboring node in a shared-media communication network indicating that the neighboring node has entered a selective forwarding mode;
    selecting an alternate node in the shared-media communication network; and
    in response to the neighboring node having entered the selective forwarding mode, sending only critical messages to the neighboring node and sending non-critical messages to the alternate node.

12. The method of claim 11, further comprising:
    in response to the alternate node providing an acceptable path for critical messages, sending critical messages to the alternative node.

13. The method of claim 11, further comprising:
in response to receiving an indication that the neighboring node operates as a leaf node, sending all messages to the alternate node.

14. The method of claim 9, wherein the alternate node is a backup parent node in a directed acyclic graph (DAG) bypassing the neighboring node in the selective forwarding mode.

15. An apparatus comprising:
one or more network interfaces to communicate with a shared-media communication network;
a processor coupled to the network interfaces and adapted to execute one or more processes; and
a memory configured to store a process executable by the processor, the process when executed operable to:
receive a notification from a neighboring node in a shared-media communication network indicating that the neighboring node has entered a selective forwarding mode;
select an alternate node in the shared-media communication network; and
send only critical messages to the neighboring node and send non-critical messages to the alternate node, in response to the neighboring node having entered the selective forwarding mode.

16. The apparatus of claim 15, wherein the process when executed is further operable to:
send critical messages to the alternative node, in response to the alternate node providing an acceptable path for critical messages.

17. The apparatus of claim 16, wherein the process when executed is further operable to:
send all messages to the alternate node in response to receiving an indication that the neighboring node operates as a leaf node.

18. The apparatus of claim 15, wherein the alternate node is a backup parent node in a directed acyclic graph (DAG) bypassing the neighboring node in the selective forwarding mode.

19. A method, comprising:
receiving, at a management node for a shared-media communication network, a message from a particular node indicating that the particular node has entered a selective forwarding mode;
determining an alternate path used to forward non-critical traffic that bypasses the particular node;
monitoring the alternate path to determine whether the alternate path complies with a service level agreement for all traffic; and
in response to determining that the alternate path complies with the service level agreement for all traffic, sending an instruction to the particular node to operate as a leaf node.

20. The method of claim 19, wherein the alternate path includes: an alternate node, wherein the alternate node is a backup parent node in a directed acyclic graph (DAG) bypassing the neighboring node in the selective forwarding mode.

* * * * *